UNITED STATES PATENT OFFICE.

ANDREW VAN BIBBER, OF CINCINNATI, OHIO.

IMPROVEMENT IN COMPOSITIONS FOR PRINTERS' INKING-ROLLERS.

Specification forming part of Letters Patent No. 113,224, dated March 28, 1871.

*To all whom it may concern:*

Be it known that I, ANDREW VAN BIBBER, of Cincinnati, Hamilton county, State of Ohio, have invented a certain new and useful Composition for Printers' Inking-Rollers; and I hereby declare the following to be a full, clear, and exact description thereof.

The nature of my invention consists in the application to compositions for inking-rollers of chloride of calcium, to give a perpetual moisture or "suction" to the roller and to prevent its hardening or drying.

My improved composition may be made substantially as follows: The proportions may be varied according to the amount of suction desired for use in summer or winter, more glue being necessary in summer-time than in winter.

For summer composition I combine the ingredients as follows: One hundred parts, by weight, of fine white glue; two hundred to two hundred and fifty parts, by weight, of dextrine sirup; three to fifteen parts, by weight, of concentrated solution chloride of calcium; one-half to one part, by weight, of carbolic acid.

The proper affinity for ink is given by adding to the above about ten parts of varnish, Venice turpentine, or Canada balsam. These, however, and all the substances above specified, except chloride of calcium, are well-known ingredients for the composition of inking-rollers, having been used for many years.

*Claim.*

Chloride of calcium in the composition of printers' inking-rollers, as described, and for the purposes specified.

In testimony of which invention I hereunto set my hand.

ANDREW VAN BIBBER.

Witnesses:
    FRANK MILLWARD,
    J. L. WARTMANN.